United States Patent [19]

Aikawa et al.

[11] Patent Number: 5,194,080
[45] Date of Patent: Mar. 16, 1993

[54] APPARATUS FOR PRODUCING HERMETIC COATED OPTICAL FIBER

[75] Inventors: Haruhiko Aikawa; Yoichi Ishiguro; Katsuya Nagayama; Ichiro Yoshimura, all of Yokohama; Yutaka Katsuyama; Nobuyuki Yoshizawa, both of Mito, all of Japan

[73] Assignee: Sumitomo Electric Industries, Ltd., Osaka, Japan

[21] Appl. No.: 739,145

[22] Filed: Aug. 1, 1991

[30] Foreign Application Priority Data

Aug. 1, 1990 [JP] Japan .................. 2-202527

[51] Int. Cl.5 .................. G02B 6/02; C03B 37/025
[52] U.S. Cl. .......................... 65/13; 65/3.11; 118/718
[58] Field of Search ............. 65/12, 13, 1, 27, 168, 65/3.11; 138/45; 118/718

[56] References Cited

U.S. PATENT DOCUMENTS

| 4,575,463 | 3/1986 | Biswas et al. | 65/3.11 |
| 4,592,932 | 6/1986 | Biswas et al. | 65/3.11 |
| 4,659,354 | 4/1987 | Roba | 65/3.11 |
| 4,790,625 | 12/1988 | Biswas et al. | 385/141 |
| 4,874,222 | 10/1989 | Vacha et al. | 385/141 |
| 4,913,715 | 4/1990 | Jochem et al. | 65/12 |
| 4,988,374 | 1/1991 | Harding et al. | 65/12 |
| 5,062,687 | 11/1991 | Sapsford | 65/3.11 |

FOREIGN PATENT DOCUMENTS

| 0095729 | 12/1983 | European Pat. Off. . |
| 0166649 | 1/1986 | European Pat. Off. . |
| 0195399 | 9/1986 | European Pat. Off. . |
| 0400938 | 12/1990 | European Pat. Off. . |
| 2-145461 | 6/1990 | Japan . |
| 2-145462 | 6/1990 | Japan . |

Primary Examiner—Robert L. Lindsay
Attorney, Agent, or Firm—Cushman, Darby & Cushman

[57] ABSTRACT

A hermetic coated optical fiber is produced by preparing a bare optical fiber by melting and drawing an optical fiber preform in a fiber drawing furnace and introducing the bare optical fiber in a reactor in which a raw material gas is introduced and forming a hermetic coating film around a surface of the bare optical fiber by a chemical vapor deposition method or pyrolysis in the reactor, wherein a part of an inert gas for purging the fiber drawing furnace which has been heated by a heater equipped in the furnace is exhausted and a rest of the inert gas is introduced in the reactor for diluting the raw material gas.

6 Claims, 7 Drawing Sheets

APPARATUS FOR PRODUCING HERMETIC COATED OPTICAL FIBER

BACKGROUND OF THE INVENTION

Field of the Invention

The present invention relates to a method and an apparatus for producing a hermetic coated optical fiber. More particularly, the present invention relates to an improvement of a method and an apparatus for producing an optical fiber in which a bare optical fiber is coated with a hermetic coating such as a carbon coating after drawing the optical fiber.

Description of the Related Art

An optical fiber is fabricated by supplying an optical fiber preform made of, for example, quartz into a fiber drawing furnace from an upper opening of the furnace to melt a lower end of the preform and drawing the molten part from a lower opening of the furnace to reduce a diameter of the quartz preform to a desired diameter.

To protect a surface of the drawn bare optical fiber, a hermetic coating thin layer of a metal, an inorganic material or an organic material is provided around the surface of the bare optical fiber. Thereafter, a coating layer of a light-curable resin is applied on the coated optical fiber.

With the hermetic coating, the optical fiber is shielded from moisture in a highly humid condition such as in water so that increase of a light transmission loss due to moisture absorption can be prevented. In addition, propagation of cracks caused by water ($H_2O$) on the fiber surface can be suppressed, so that decrease of strength of the optical fiber due to fatigue is prevented. Accordingly, the hermetic coated optical fiber attracts attention as an environment resistant fiber such as as an optical fiber for a submarine cable, and is practically used.

In general, the hermetic coating is formed on the optical fiber by a chemical vapor deposition (CVD) method in using a reactor for coating having a heating source such as a heater as means for providing a thin film on the bare optical fiber. In this connection, the CVD method for hermetic coating includes a normal pressure thermal CVD and a reduced pressure thermal CVD, but excludes a plasma CVD.

Alternatively, the hermitic coating can be formed from a carbon film generated by pyrolysis of a gas containing a hydrocarbon.

In the both methods, when the bare optical fiber is exposed to an exterior atmosphere in a space between the fiber drawing furnace and the reactor in which the hermetic coating is applied, the gas exited from the drawing furnace and the reactor is partly inhaled and recovered, whereby an air stream around the bare optical fiber is disturbed, so that the optical fiber suffers from temperature fluctuation, temperature decrease or attack by floating particles in the exterior atmosphere and cannot be coated by the hermetic coating under stable conditions. Further, turbulence of the gas stream will result in vibration of the fiber or fluctuation of the fiber diameter.

To keep the temperature of the bare optical fiber high or reduce the fluctuation of the temperature, it is proposed to use an apparatus comprising an optical fiber drawing furnace and a reactor for hermetic coating which are integrated together (of U.S. Pat. Nos. 4,702,759 and 4,790,625) or an apparatus having a shield between an optical fiber drawing furnace and a reactor (cf. Japanese Patent Kokai Publication No. 32270/1986). It is also proposed to reheat the bare optical fiber to prevent temperature decrease of the fiber before the fiber is introduced in the reactor. Further, it is disclosed in Japanese Patent Application No. 296279/1988 to prevent cooling of the bare optical fiber through heating of an inert gas to be introduced in a reactor for hermetic coating with heat of the fiber drawing furnace and the like.

The integral apparatus of the above U.S. Patents or the apparatus having the shield can advantageously prevent influence of the exterior atmosphere, keep the film forming temperature by avoiding the decrease of the surface temperature of the optical fiber and avoid inclusion of the floating particles from the exterior atmosphere into the reactor. However, since a heated purging gas from the fiber drawing furnace directly goes into the reactor and the gases in the furnace and the reactor interfere each other, it is difficult to control a temperature of the gas in the reactor or a concentration of a raw material gas for hermetic coating.

By the simple introduction of the preheated dilution gas in the reactor, it is possible to control the temperature of the gas or the concentration of the raw material in the reactor. However, if a fiber drawing rate is low or the fiber diameter is small, the bare optical fiber exiting from the fiber drawing furnace is cooled by the atmospheric air, the surface temperature of the optical fiber is lowered and a deposition temperature of the film varies, so that the control of the film properties becomes difficult.

SUMMARY OF THE INVENTION

An object of the present invention is to provide a method for producing a hermetic coated optical fiber which can form a uniform hermetic coating even at a low fiber drawing rate or with a small fiber diameter.

Another object of the present invention is to provide an apparatus for producing a hermetic coated optical fiber which is suitable for forming a uniform hermetic coating even at a low fiber drawing rate or with a small fiber diameter.

According to a first aspect of the present invention, there is provided a method for producing a hermetic coated optical fiber comprising steps of preparing a bare optical fiber by melting and drawing an optical fiber preform in a fiber drawing furnace and introducing the bare optical fiber in a reactor in which a raw material gas is introduced and forming a hermetic coating film around a surface of the bare optical fiber by a chemical vapor deposition method or pyrolysis in the reactor, wherein a part of an inert gas for purging the fiber drawing furnace which has been heated by a heater equipped in the furnace is exhausted and a rest of the inert gas is introduced in the reactor for diluting the raw material gas.

According to a second aspect of the present invention, there is provided an apparatus for producing a hermetic coated optical fiber comprising a fiber drawing furnace, a reactor for hermetic coating of an optical fiber, and a gas shielding member which is provided between the drawing furnace and the reactor and has at least one gas outlet an opening area of which is preferably freely adjustable.

DETAILED DESCRIPTION OF THE INVENTION

An example of the apparatus for producing a hermetic optical fiber according to the present invention will be explained by making reference to FIGS. 1 to 4.

Figure 1:
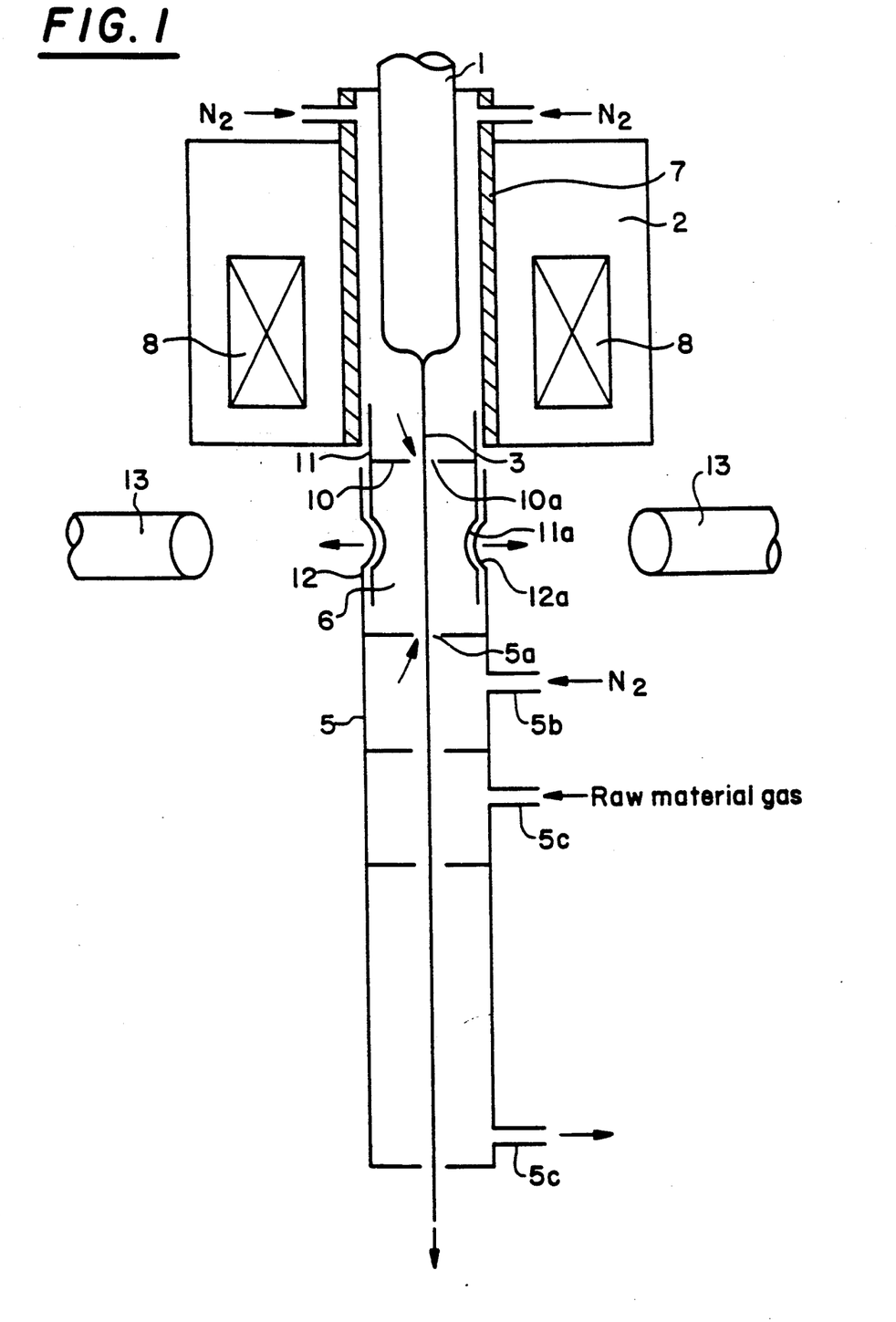
FIG. 1 is a cross sectional view of an example of an apparatus for producing a hermetic coated optical fiber according to the present invention.

FIG. 1 shows a cross sectional view of an example of the apparatus for producing a hermetic optical fiber according to the present invention. This apparatus comprises a fiber drawing furnace 2 in which a lower part of a preform 1 for an optical fiber is molten and drawn and a reactor 5 in which a hermetic coating is formed around a bare optical fiber 3 prepared by the furnace 2. The apparatus further comprises a gas shielding member, namely a gas buffering chamber 6 between the furnace 2 and the reactor 5.

In the fiber drawing furnace 2, a muffle tube 7 is installed, and in the muffle tube 7, the preform 1 is suspended by an arm (not shown). In the muffle tube 7, an inert gas such as nitrogen gas is supplied to stabilize drawing conditions for the formation of the bare optical fiber 3.

The furnace 2 has a heater 8 for heating and melting the lower end of the preform 1, and the bare optical fiber 3 is drawn from the molten lower end of the preform 1. The drawn bare optical fiber 3 exits from a lower opening of the furnace 2, passes through the gas buffering chamber 6, and then goes into the reactor 5 via an introduction opening 5a. In the reactor 5, the bare optical fiber is hermetically coated with carbon and the like.

The reactor 5 has branch pipes 5b, 5c and 5d. From the pipe 5b, an inert gas such as a nitrogen gas is introduced in the reactor 5 as a sealing gas, and from the pipe 5c, a raw material gas for the hermetic coating of the optical fiber is supplied in the reactor 5. The raw material gas is, for example, pyrolyzed in the reactor 5 to form a thin film of carbon and the like around the bare optical fiber 3. The sealing gas and the raw material gas are exhausted from the pipe 5d.

Figure 2:
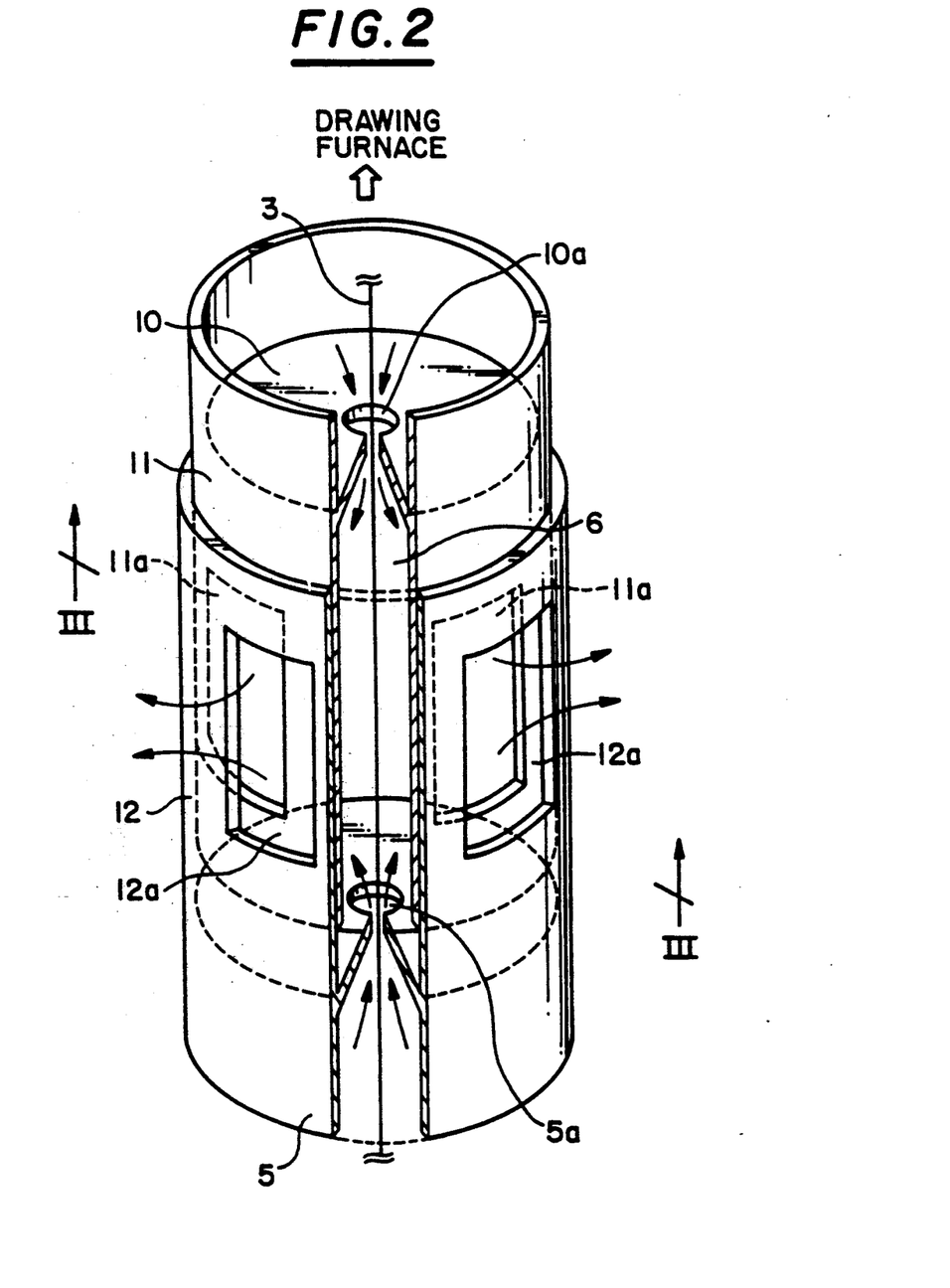
FIG. 2 is a partly cut away perspective view of a gas buffering chamber used as a gas shielding member according to the present invention.

According to the present invention, the apparatus has the gas buffering chamber 6 between the fiber drawing furnace 2 and the reactor 5. As shown in FIG. 2, the gas buffering chamber 6 comprises a partition 10, an upper tube 11 which is closely engaged with the lower end of the fiber drawing furnace 2, and a lower tube 12 which is integrally formed with the upper tube and engages around the upper tube. At the center of the partition 10, a hole 10a is bored, and through this hole 10a, the fiber drawing furnace 2 and the gas buffering chamber 6 communicate each other, and the bare optical fiber 3 is introduced in the gas buffering chamber 6 though the hole 10a. Also, the gas buffering chamber 6 communicates with the interior of the reactor 5 through an introduction opening 5a. Thus, from the gas in the fiber drawing furnace 2 and the gas in the reactor 5 gush into the gas buffering chamber 6 through the hole 10a and the introduction opening 5a, respectively.

Figure 3:
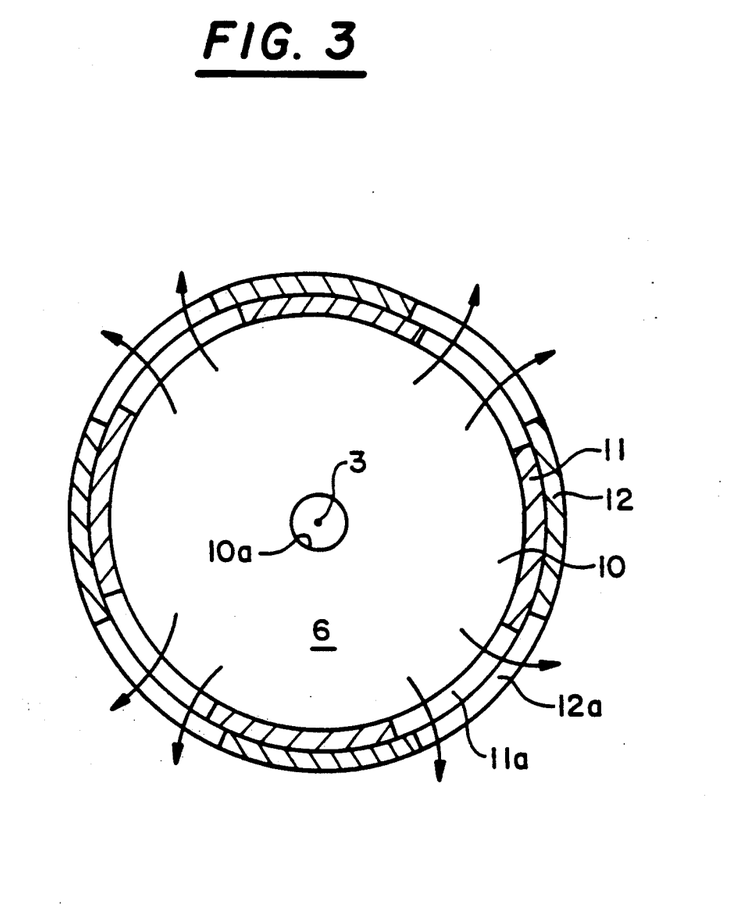
FIG. 3 is a cross sectional view of the gas buffering chamber of FIG. 2 along the line III—III.

FIG. 3 shows the cross sectional view of the gas buffering chamber 6 of FIG. 2. On the peripheral walls of the upper and lower tubes 11 and 12, plural windows 11a and 12a are formed. Then, an overlapping part of the windows 11a and 12a functions as an outlet of the gas buffering chamber 6, and the gasses flowed into the gas buffering chamber 6 from the fiber drawing furnace 2 and the reactor 5 are exhausted from the overlapped part of the windows. An area of the overlapped part of the windows, namely an opening area of the outlet is adjustable by rotating the upper tube 11 in relation to the lower tube 12, and adjusted according to an amount of gasses flowed from the fiber drawing furnace 2 and the reactor 5 into the gas buffering chamber 6. By such adjustment of the area of the overlapped part, a pressure in the gas buffering chamber 6 is kept lower than the gas pressure in the fiber drawing furnace and the reactor and higher than exterior pressure. By the control of the pressure, interference of the gas in the gas buffering chamber is suppressed, and the inflow of the exterior gas into the gas buffering chamber is prevented. The gas exhausted from the gas buffering chamber is inhaled through an exhaust duct 13 (see FIG. 1).

Since the gas buffering chamber 6 is provided between the fiber drawing furnace 2 and the reactor 5, the bare optical fiber 3 is introduced in the reactor 5 without being exposed to the exterior gas. Though the gasses are always gushed from the furnace 2 and the reactor 5, they do not interfere each other since the gas gushed into the gas buffering chamber 6 is exhausted from the outlet windows. Accordingly, the amounts of the gasses supplied in the furnace 2 and the reactor are independently controlled, and it is possible to prevent the change of the reaction conditions, namely the hermetic coating conditions in the reactor due to the inflow of the gas from the furnace 2 into the reactor 5 or the change of the fiber drawing conditions in the furnace due to the inflow of the gas from the reactor 5 into the furnace 2. Therefore, the fiber drawing conditions in the furnace and the hermetic coating conditions in the reactor are kept stable.

By using the apparatus of FIG. 1 or an apparatus having the same constructions except the absence of the gas buffering chamber, a hermetic coated optical fiber was fabricated. In each case, an electric power supplied to the heater of the fiber drawing furnace was 10.2 kW; the sealing gas (nitrogen) and the raw material gas including a carrier gas were supplied at flow rates of 4 liter/min. and 400 cc/min., respectively, and the gas was exhausted from the reactor at a rate of 2 liter/min.

The bare optical fiber had a diameter of 125 $\mu$m and was introduced in the reactor at a rate of 250 m/min.

The results are shown in Table 1.

| Gas buffering chamber | No | Yes |
|---|---|---|
| Tensile strength (kgf) | 5.3 | 5.7 |
| Film thickness (Å) | 400 | 500 |
| Screening (2%) [times/10 km] | 4 | 0 |
| Fluctuation of | ±0.9 $\mu$m | ±0.5 $\mu$m |

-continued fiber diameter

As understood from the above results, when the optical fiber is hermetically coated by the apparatus of the present invention having the gas buffering chamber, the coated fiber has the better tensile strength and less breakage in the screening than the coated optical fiber produced by the apparatus having no gas buffering chamber, and the fluctuation of the fiber diameter of the former is only one half of that of the latter.

The screening is carried out by applying a strain of 2% in the longitudinal direction of the coated optical fiber.

Figure 4:
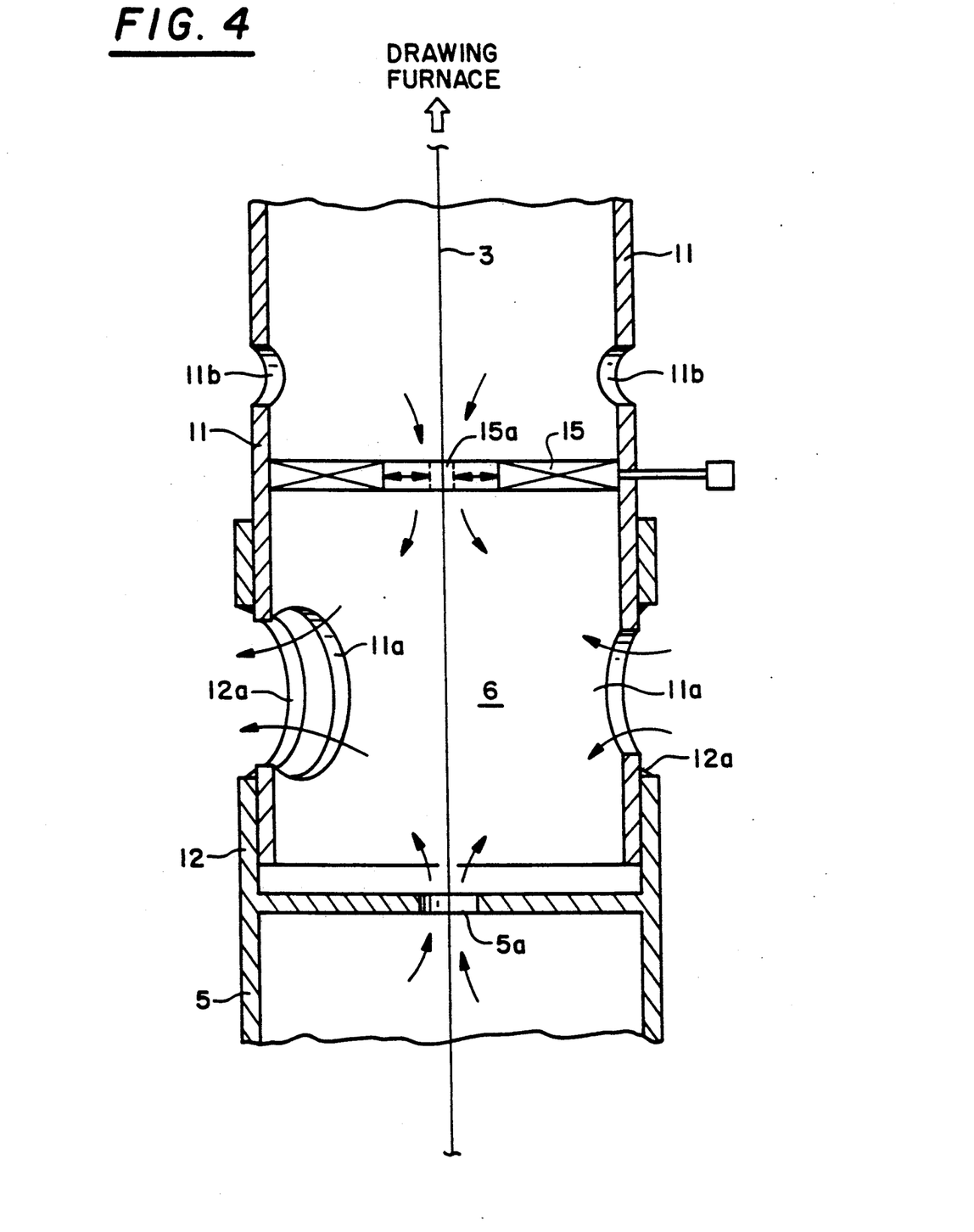
FIG. 4 shows a modification of the gas buffering chamber according to the present invention.

As shown in FIG. 4, in place of the partition 10, the gas buffering chamber can have an iris diaphragm 15, an area of a communication opening 15a of which can be freely adjusted. Through the communication opening 15a, the fiber drawing furnace 2 and the gas buffering chamber 6 are communicated. Also, on the furnace side of the upper tube 11 in relation to the iris diaphragm 15, exhaust outlets 11b are formed. By adjusting the opening area of the opening 15a, an amount of the gas which flows into the gas buffering chamber 6 from the furnace 2 is adjusted, and a part of the gas from the furnace 2 is exhausted through the outlets 11b. Thereby, the fluctuation of the fiber diameter can be decreased to ±0.15 µm.

When the iris diaphragm is provided between the gas buffering chamber and the reactor and the exhaust outlet is formed on the reactor side of the lower tube, the fluctuation of the fiber diameter can be suppressed.

In another preferred embodiment of the present invention, a part of the gas for purging the furnace which has been heated in the furnace is exhausted, while the rest of the purging gas is introduced as a dilution gas in the reactor for hermetically coating the bare optical fiber, preferably together with a fresh inert gas to be introduced in the reactor.

Figure 5:
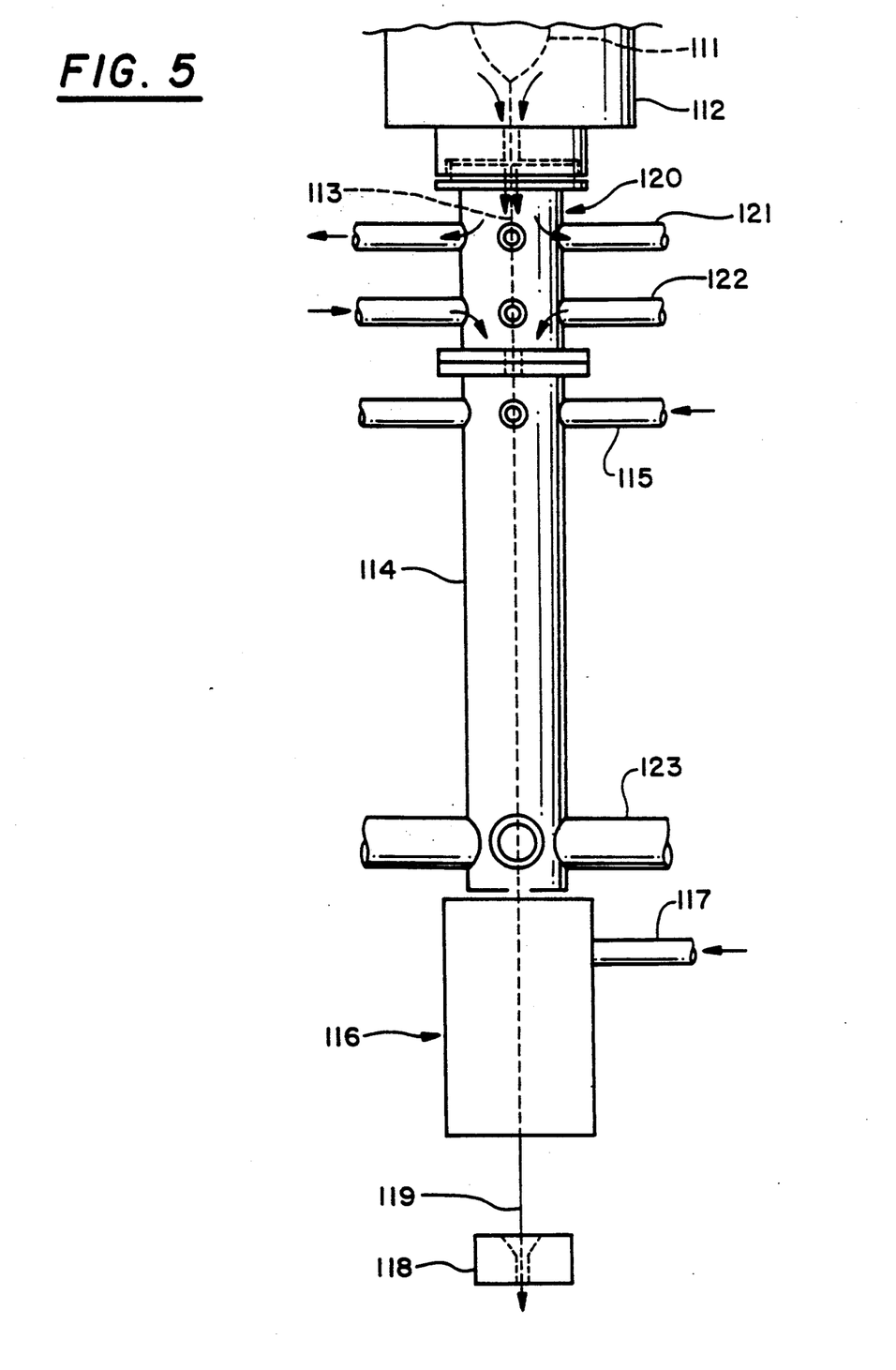
FIG. 5 is a side view of another example of an apparatus for producing a hermetic coated optical fiber according to the present invention.

In this embodiment, an apparatus of FIG. 5 is preferably used. This apparatus has a gas shielding member 120 between the fiber drawing furnace 112 and the reactor 114.

This embodiment is particularly useful in the case where the fiber drawing rate is made low, for example 150 m/min. or lower because of a small diameter of the fiber, for example, 120 µm or less or other limitations, since under such conditions, the fiber exited from the furnace is cooled before entering the reactor for hermetic coating and a fiber temperature suitable for hermetic coating cannot be maintained. When the gas shielding member 120 is provided, the bare optical fiber is introduced together with the purging gas exhausted from the furnace into the reactor without touching the exterior gas. Therefore, the decrease of the fiber temperature is prevented, and the interior temperature of the reactor can be maintained properly by using the heated inert gas under control.

On the contrary, when the fiber drawing rate is high, for example 400 m/min. or higher, the fiber temperature in the reactor becomes high, so that the temperature condition may be outside the optimum range for forming the hermetic coating with good quality.

Figure 6:
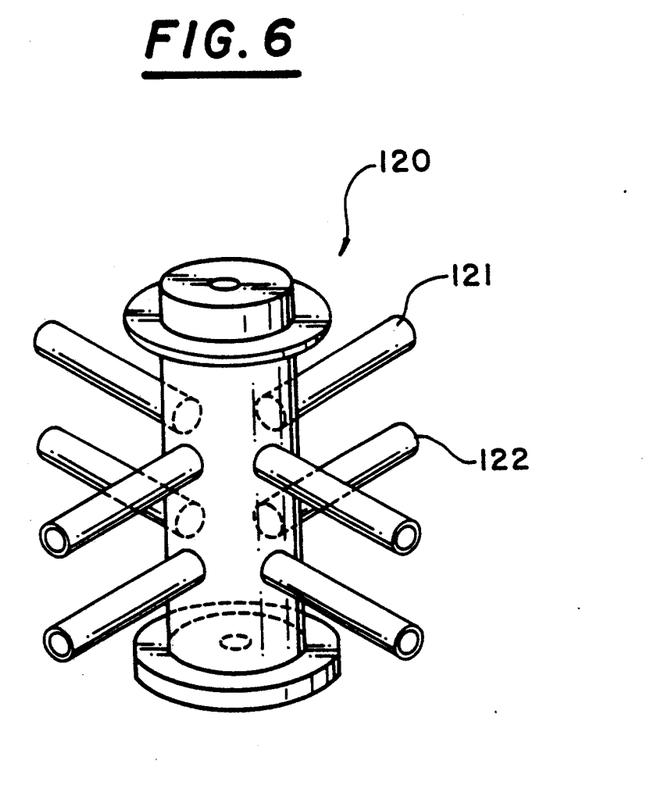
FIG. 6 is a perspective view of a gas shielding member according to the present invention.

This embodiment will be explained by making reference to FIGS. 5 and 6.

The apparatus of FIG. 5 comprises a fiber drawing furnace 112 in which a preform for optical fiber 111 is introduced and which has a carbon heater (not shown). The introduced preform is heated and molten by the carbon heater and drawn to form a bare optical fiber 113.

When the bare optical fiber 113 passes through the reactor 114, it is hermetically coated by the reaction of a reaction gas supplied through an inlet tube 115 for a raw material gas and then cooled in a forced cooling device 116, in which the coated optical fiber 119 is cooled with a cooling gas supplied through a cooling gas inlet tube 117 to a temperature at which a photocurable resin can be coated on the hermetic coated optical fiber in a resin coating device 118.

In this apparatus, the gas shielding member 120 is air tightly engaged with the fiber drawing furnace 112 and the reactor 114.

The gas shielding member 120 has gas outlet tubes 121 for exhausting the purging gas which flows from the furnace 112, and gas inlet tubes 122 for introducing a fresh inert gas. The number of the outlet tubes and the inlet tubes is arbitrary and may be one or more. A length of the gas shielding member 120 is adjusted according to the fiber drawing conditions.

The tip ends of the outlet tubes 121 and the inlet tubes 122 are connected with a flow controller (not shown) and optionally with an pump. A temperature of each inlet tube 122 is controlled.

By the above construction, a flow rate and a temperature of the inert gas (dilution gas) to be supplied in the reactor 114 are adjusted. Examples of the inert gas are nitrogen gas, argon gas, helium gas, etc.

By the apparatus of FIG. 5, the flow rate of the exhausted gas from the furnace can be freely adjusted, and the temperature of the rest of the purging gas to be introduced in the reactor 114 can be controlled at a desired temperature.

By using the apparatus of FIG. 5, hermetic coated optical fibers were produced in the following examples.

In the following examples, $C_2H_4$ and $CHCl_3$ were used as raw material gasses, and helium was used as a carrier gas. They were supplied in the reactor 114 through the inlet tube 115. As the purging gas of the fiber drawing furnace and the cooling shielding gas, nitrogen was used.

EXAMPLE 1

Under the following conditions, the carbon coating was formed around the bare optical fiber with varying a flow rate of the cooling inert gas:
Glass fiber diameter: 80 µm
Fiber draw rate: 250 m/min.
Shielding length of the gas shielding member: 5 cm
Flow rate of $C_2H_4$: 100 cc/min.
Flow rate of $CHCl_3$: 300 cc/min.
Exhaust rate of purging gas of the furnace: 10 l/min.

COMPARATIVE EXAMPLE

Under the following conditions, the carbon coating was formed around the bare optical fiber:
Glass fiber diameter: 80 µm
Fiber draw rate: 250 m/min.
No gas shielding.
Flow rate of $C_2H_4$: 100 cc/min.
Flow rate of $CHCl_3$: 300 cc/min.

The properties of the carbon coated optical fibers produced in Example 1 and Comparative Example are shown in Table 2.

TABLE 2

| | Flow rate of purging gas ($QN_2$/ $1 \cdot min^{-1}$) | Exhaust rate of supplied gas ($QN_2$/ $1 \cdot min^{-1}$) | Initial tensile strength ($\sigma_B$/ GPa) | Fatigue index (n) | Hydrogen resistance ($\Delta\alpha_{1.24}$/ $dB \cdot km^{-1}$) |
|---|---|---|---|---|---|
| Ex. 1 | | | | | |
| Run 1 | 10 | — | 5.22 | 200 | 0 |
| Run 2 | 10 | 0.1 | 5.26 | 180 | 0 |
| Run 3 | 10 | 0.5 | 5.54 | 150 | 0.05 |
| Run 4 | 10 | 1.0 | 5.76 | 160 | 0.15 |
| Run 5 | 10 | 3.0 | 5.31 | 45 | 2.60 |
| Comp. Ex. | — | — | 4.9 | 35 | 3.5 |

EXAMPLE 2

Under the following conditions, the carbon coating was formed around the bare optical fiber with varying a flow rate of the purging gas of the furnace:
Glass fiber diameter: 80 μm.
Fiber draw rate: 250 m/min.
Shielding length of the gas shielding member: 5 cm
Flow rate of $C_2H_4$: 100 cc/min.
Flow rate of $CHCl_3$: 300 cc/min.
Exhaust rate of supplied gas: 1.0 l/min.

The properties of the carbon coated optical fibers produced in Example 2 are shown in Table 3.

TABLE 3

| | Flow rate of purging gas ($QN_2$/ $1.min^{-1}$) | Exhaust rate of supplied gas ($QN_2$/ $1.min^{-1}$) | Initial tensile strength ($\sigma_B$/ GPa) | Fatigue index (n) | Hydrogen resistance ($\Delta\alpha_{1.24}$/ $dB.km^{-1}$) |
|---|---|---|---|---|---|
| Run 1 | 0 | 1.0 | 4.21 | 90 | 0.15 |
| Run 2 | 3.0 | 1.0 | 4.36 | 70 | 0.20 |
| Run 3 | 5.0 | 1.0 | 4.89 | 130 | 0.20 |
| Run 4 | 7.0 | 1.0 | 5.18 | 150 | 0.05 |

EXAMPLE 3

Under the following conditions, the carbon coating was formed around the bare optical fiber with varying a flow rate of the cooling inert gas:
Glass fiber diameter: 125 μm
Fiber draw rate: 100 m/min.
Shielding length of the gas shielding member: 5 cm
Flow rate of $C_2H_4$: 100 cc/min.
Flow rate of $CHCl_3$: 300 cc/min.
Exhaust rate of purging gas of the furnace: 10 l/min.

The properties of the carbon coated optical fibers produced in Example 3 are shown in Table 4.

TABLE 4

| | Flow rate of purging gas ($QN_2$/$1.min^{-1}$) | Initial tensile strength ($\sigma_B$/GPa) | Fatigue index (n) | Hydrogen resistance ($\Delta\alpha_{1.24}$/ $dB.km^{-1}$) |
|---|---|---|---|---|
| Run 1 | — | 4.89 | 210 | 0 |
| Run 2 | 0.1 | 4.97 | 220 | 0 |
| Run 3 | 0.5 | 5.11 | 230 | 0.10 |
| Run 4 | 1.0 | 5.28 | 340 | 0.35 |
| Run 5 | 3.0 | 5.41 | 55 | 2.30 |

As is clear from the results in Tables 2, 3 and 4, when the apparatus of the present invention is used, the film quality is more uniform and the properties are better than in Comparative Example even when the optical fiber is made as thin as 80 μm. At the low fiber drawing rate, the optical fiber has good properties. When the fiber drawing rate is decreased to 50 m/min., the hermetic coating has good quality.

Herein, the screening test and measurements of the fatigue index and the hydrogen resistance are carried out as follows:

SCREENING

Figure 7:
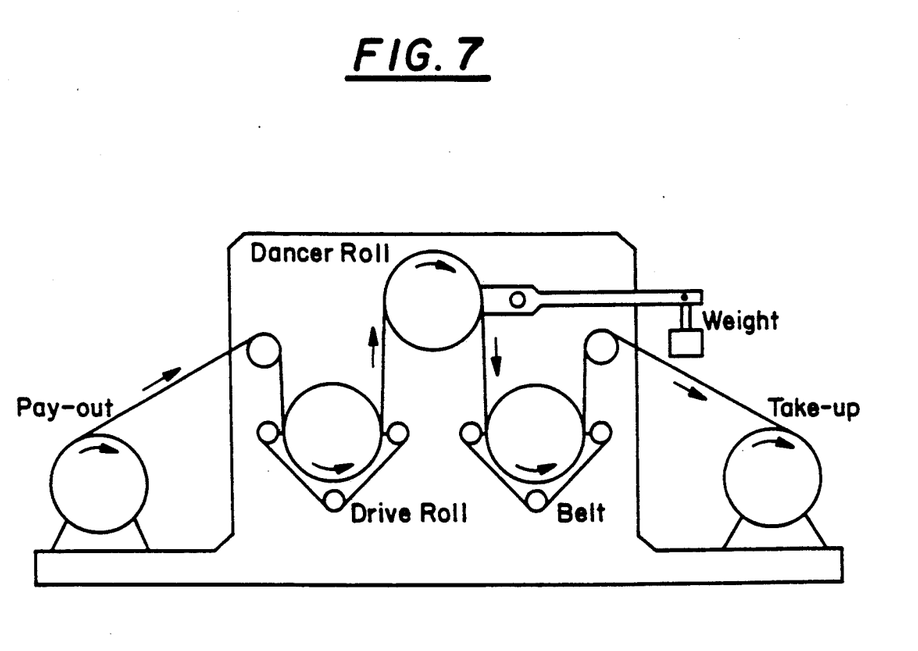
FIG. 7 shows a screening test apparatus.

The screening test is carried out by an apparatus of FIG. 7. The double driving rolls with soft rubber belts suppress the optical fiber, providing sufficient friction force (2% strain) so that screening test is given to the optical fiber through a dancer roll. The number of breakage per 10 km of the optical fiber is recorded.

FATIGUE INDEX (N)

The dynamic fatigue is used. The dynamic fatigue is caused by the change of a load stress applied to the optical fiber over time. When a tensile test is carried out at a specific stress load rate δ, a time till the optical fiber is broken ($t_d$) and strength at break ($\sigma_d$) satisfy the following equation:

$$\log t_d = -n \log \sigma_d + \log k_d$$

in which $\sigma_d$ and $k_d$ are expressed by the following equations:

$$\log \sigma_d = (l+n)^{-1} \log \delta + (l+n)^{-1} \log k_d$$

$$\log k_d = \log k_s + \log (n+l)$$

where $k_s$ is a constant depending on a material and a size of the optical fiber and atmosphere.

HYDROGEN RESISTANCE $$\Delta\alpha_{1.24} = \alpha_{1.24} - \alpha^0_{1.24} \text{ (dB/km)}$$

in which $\alpha^0_{1.24}$ is an initial transmission loss at a wavelength of 1.24 μm and $\alpha_{1.24}$ is a transmission loss at a wavelength of 1.24 μm after treatment of the optical fiber in the pure hydrogen atmosphere of 1 Atm. at 80° C. for 20 hours.

What is claimed is:

1. An apparatus for producing a hermetic coated optical fiber comprising:
  a fiber drawing furnace;
  a reactor for hermetic coating of an optical fiber drawn from said fiber drawing furnace; and
  a gas shielding member provided between said drawing furnace and said reactor, said gas shielding member having at least one gas outlet.

2. The apparatus according to claim 1, wherein an opening area of said gas outlet is freely adjustable.

3. The apparatus according to claim 1, wherein said gas shielding member has at least one gas inlet.

4. The apparatus according to claim 1, wherein a communication opening is provided between said fiber drawing furnace and said gas shielding member, said communication opening having an opening area which is adjustable.

5. The apparatus according to claim 1, wherein a communication opening is provided between said gas shielding member and said reactor, said communication opening having an opening area which is adjustable.

6. The apparatus according to claim 1, wherein said gas shielding member has a gas inlet below said at least one gas outlet.

* * * * *